(12) United States Patent
Tabata et al.

(10) Patent No.: US 9,538,058 B2
(45) Date of Patent: Jan. 3, 2017

(54) IMAGING DEVICE

(71) Applicant: Panasonic Corporation, Osaka (JP)

(72) Inventors: Kazumasa Tabata, Osaka (JP);
Hiroyuki Kamezawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 39 days.

(21) Appl. No.: 14/481,955

(22) Filed: Sep. 10, 2014

(65) Prior Publication Data
US 2015/0237261 A1  Aug. 20, 2015

(30) Foreign Application Priority Data

Feb. 14, 2014 (JP) .................................. 2014-026141
Jul. 14, 2014 (JP) .................................. 2014-143818

(51) Int. Cl.
*H04N 5/232* (2006.01)
*H04N 5/77* (2006.01)
*H04N 5/907* (2006.01)
*H04N 9/804* (2006.01)

(52) U.S. Cl.
CPC .............. *H04N 5/232* (2013.01); *H04N 5/772* (2013.01); *H04N 5/907* (2013.01); *H04N 9/8042* (2013.01)

(58) Field of Classification Search
CPC ........ H04N 5/233; H04N 5/772; H04N 5/907; H04N 5/804; H04N 5/23293
See application file for complete search history.

(56) References Cited

U.S. PATENT DOCUMENTS

| 6,686,958 | B1 * | 2/2004 | Watanabe | G06F 1/1626 348/207.1 |
| 6,750,914 | B2 * | 6/2004 | Sannoh | H04N 5/23293 348/333.02 |
| 7,471,328 | B2 * | 12/2008 | Kim | H04N 1/0044 348/230.1 |

FOREIGN PATENT DOCUMENTS

| JP | 09-023405 | 1/1997 |
| JP | 2003-274249 | 9/2003 |
| JP | 2009-044277 | 2/2009 |

* cited by examiner

*Primary Examiner* — Tuan Ho
(74) *Attorney, Agent, or Firm* — Wenderoth, Lind & Ponack, L.L.P.

(57) ABSTRACT

The imaging device has a display section, an imaging section configured to generate an image of an object, an operation section configured to accept an operation, and a record control section. The record control section starts recording of video image data based on the generated image after a predetermined operation through the operation section is accepted and a predetermined period of time passes thereafter. Until the operation section accepts the predetermined operation, the display section displays a first mark in a first form. Until the predetermined period of time passes after acceptance of user operation thorough the operation section, the display section displays the first mark in a second form. After the predetermined period of time passes, the display section displays a second mark different from the first mark.

7 Claims, 4 Drawing Sheets

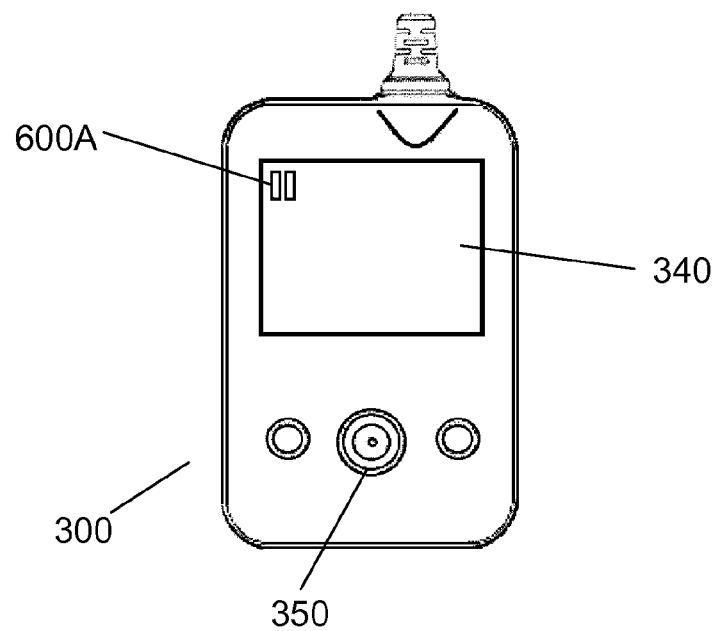
FIG. 4A
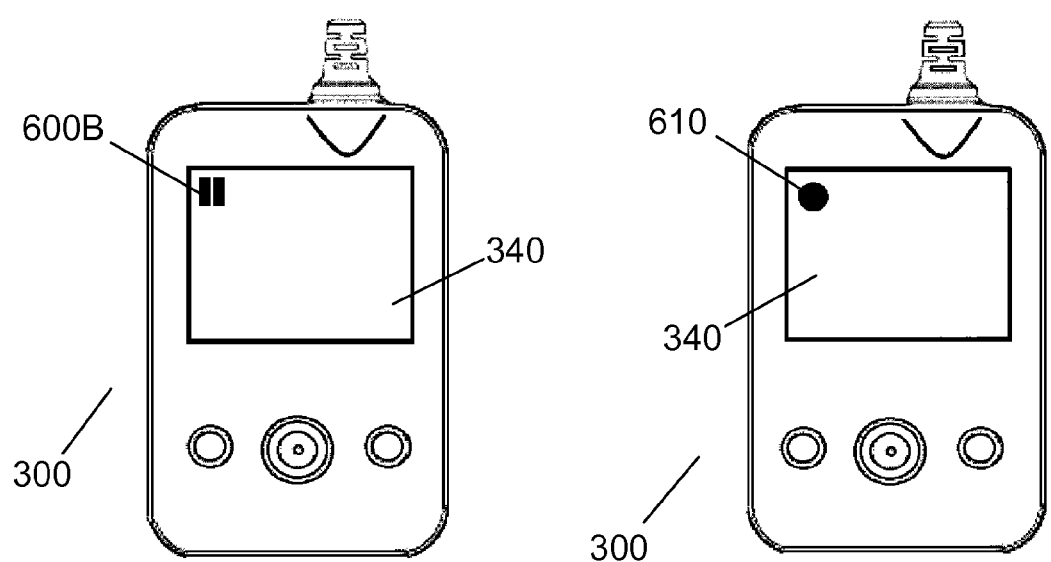
FIG. 4B
FIG. 4C

IMAGING DEVICE

BACKGROUND

1. Technical Field

The present disclosure relates to an imaging device.

2. Background Art

For example, an imaging device is disclosed in Japanese Unexamined Patent Application Publication No. 2009-44277. Receiving a recording-start command, the imaging device starts recording after a predetermined period of time has passed. The device informs the user that the recording is started and in progress by blinking a light-emitting means upon acceptance of the recording-start command.

SUMMARY

The imaging device of the present disclosure has a display section, an imaging section configured to generate an image of an object, an operation section configured to accept an operation, and a record control section. After a predetermined operation is accepted through the operation section and a predetermined period of time passes thereafter, the record control section starts recording the video data based on the generated image onto a recording medium. The display section displays a first mark in a first form until the operation section accepts a predetermined user-operation. In response to acceptance of the operation through the operation section, the display section displays the first mark in a second form different from the first form until the predetermined period of time passes. After the predetermined period of time passes, the display section displays a second mark different from the first mark.

As the imaging device that start recording after a predetermined operation through the operation section is accepted and a predetermined period of time passes thereafter, the present disclosure offers user-friendly display which can provide the user with easy understanding on the working state of the device.

BRIEF DESCRIPTION OF THE DRAWINGS

FIG. 4A through FIG. 4C show an example of display relating to video recording of the wearable camera shown in FIG. 1.

DETAILED DESCRIPTION OF PREFERRED EMBODIMENT

In a conventional imaging device, only blinking of the light-emitting means can cause a discrepancy between the contents actually recorded by the imaging device and the recording contents assumed by the user.

Hereinafter, an exemplary embodiment of the present disclosure will be described in detail with reference to the drawings as needed. In the exemplary embodiment, the imaging device that starts recording after a predetermined period of time has passed from a request of recording start displays the working state of the imaging device in a user-friendly manner. However, an excessively detailed description may be omitted; for example, detailed description on well-known matters or overlapping description on substantially the same structure may be omitted so as to eliminate redundancy for the sake of easy understanding of persons skilled in the art.

It is to be understood that the accompanying drawings and the description below are given for purposes of illustration in order that persons skilled in the art may fully understand the disclosure, and are not intended to be limiting of the claimed subject matter.

Figure 1A:
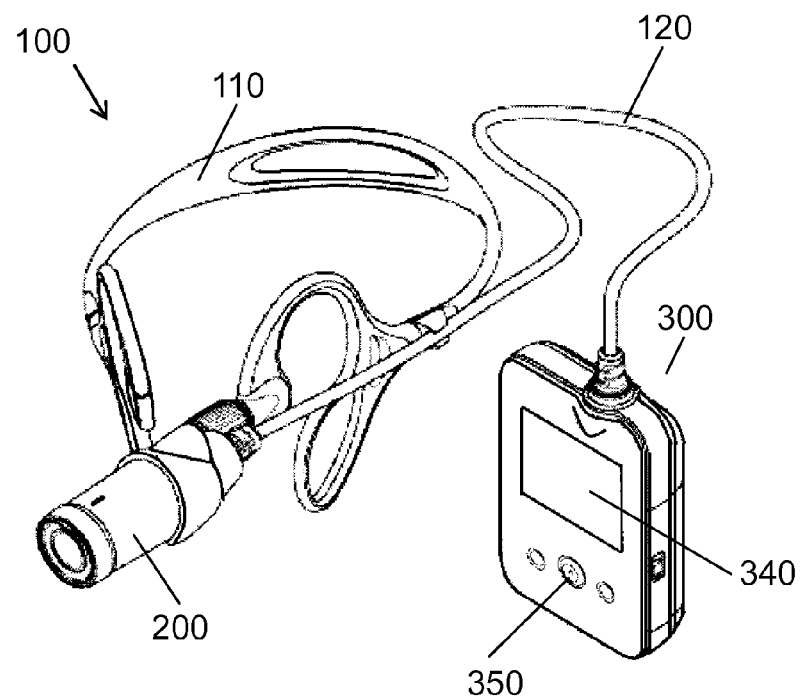
FIG. 1A is an external view of a wearable camera as an example of an imaging device in accordance with an exemplary embodiment of the present disclosure.
Figure 1B:
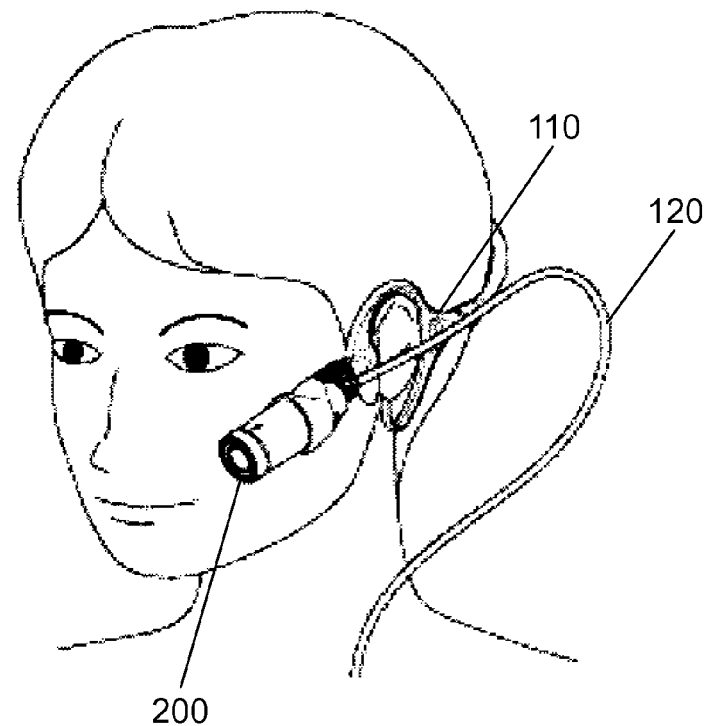
FIG. 1B shows the state in which a user wears a camera head as the imaging section of the wearable camera shown in FIG. 1A.
Figure 2:
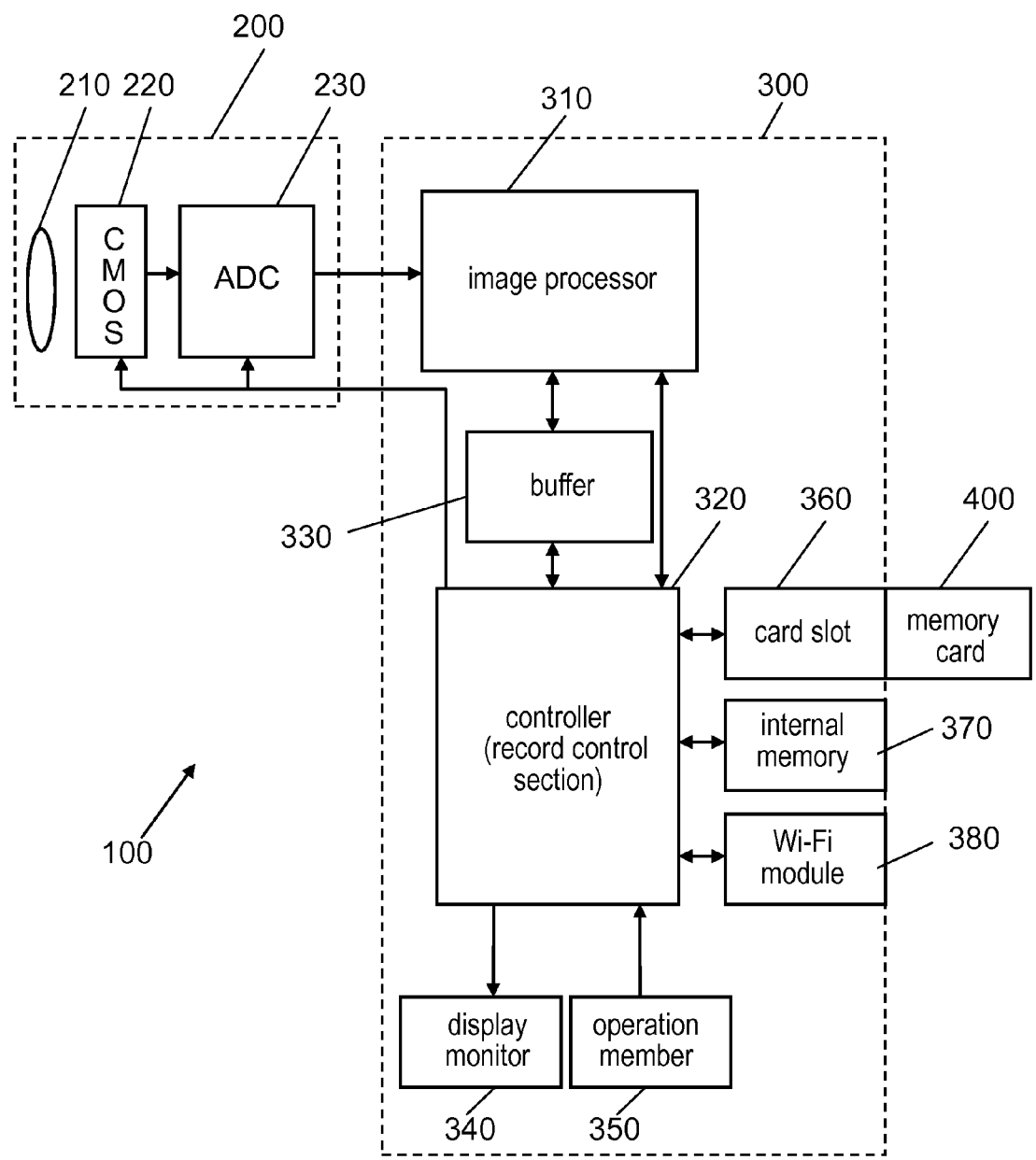
FIG. 2 is a block diagram showing the electrical configuration of the wearable camera of FIG. 1.
Figure 3:
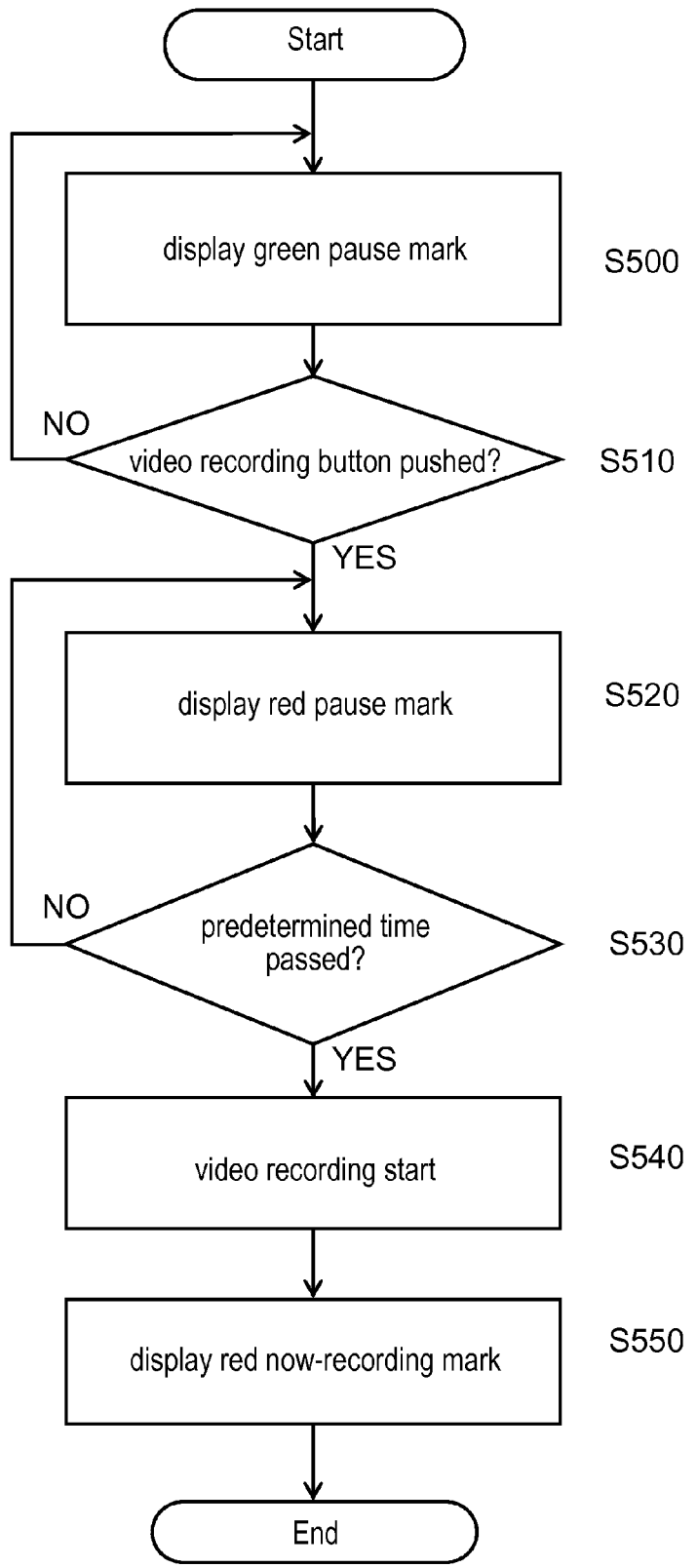
FIG. 3 is a flowchart showing the display procedure relating to video recording of the wearable camera shown in FIG. 1.

As an example of the imaging device of the embodiment of the present disclosure, wearable camera 100 will be described with reference to FIG. 1A through FIG. 4C. FIG. 1A is an external view of wearable camera 100. FIG. 1B shows the state in which a user wears camera head 200. FIG. 2 is a block diagram showing the electrical configuration of wearable camera 100. FIG. 3 is a flowchart showing the display procedure relating to video recording of wearable camera 100. FIG. 4A through FIG. 4C show an example of display relating to video recording of wearable camera 100.

As is shown in FIG. 1A, wearable camera 100 has camera cable 120, camera head 200, and camera body 300. Camera head 200 is an imaging section that takes an image of an object. The image data generated by camera head 200 is transmitted to camera body 300 via camera cable 120.

Camera body 300 has display monitor 340 as a display section, and operation member 350 including operation buttons that receive user operation. Receiving video image data based on the image data transmitted via camera cable 120, camera body 300 stores the data in a recording medium such as memory card 400, and shows the image on display monitor 340.

Camera body 300 may be connected to camera head 200 via cable connection (i.e., via camera cable 120) or via wireless connection. That is, display monitor 340 is included in camera body 300 that is a unit separated from camera head 200 and is connected to camera head 200 via cable connection or wireless connection.

Camera head 200 can be fixed to ear hook 110. As shown in FIG. 1B, the user wears ear hook 110 on their both ears in a state that camera head 200 is fixed to ear hook 110. Using ear hook 110 allows the user to turn the recording direction of wearable camera 100 by changing the facing direction of the user with no need for holding it by hand. That is, ear hook 110 serves as a holder for fixing camera head 200 as the imaging section to a position that turns in the direction together with the visual direction of the user.

The user, while wearing ear hook 110 with camera head 200 fixed, operates operation member 350 to give a request for video recording. At that time, the user may be looking at operation member 350 or the image shown on display monitor 340. Therefore, the image of camera body 300 itself can be put into the starting part of the video image to be recorded.

To avoid the situation above, in response to pushing one of the operation buttons for recording operation, which is an operation of operation member 350 by the user, wearable camera 100 starts recording after a predetermined period of time has passed. During the operation above, wearable camera 100 displays the current working state of itself on display monitor 340 so as not to cause a discrepancy between the contents actually recorded by the imaging device and the recording contents assumed by the user.

Specifically, when wearable camera 100 stands by for the video recording command, pause mark 600A of green is shown on the monitor, as shown in FIG. 4A. Upon receiving the video recording command, wearable camera 100 changes mark 600A to pause mark 600B of red, as shown in FIG. 4B. Upon the start of video recording, wearable camera 100 further changes mark 600B to now-recording mark 610 of red, as shown in FIG. 4C.

That is, display monitor 340 displays the pause mark as a first mark in green as a first form until operation member 350 accept a predetermined operation. Until a predetermined time passes after operation member 350 has accepted a predetermined operation, display monitor 340 displays the pause mark in red as a second form different from the first form. After a predetermined time has passed, display monitor 340 displays the now-recording mark as a second mark different from the pause icon.

In this case, the first mark indicates the previous state of recording video image data onto a recording medium, while the second mark indicates that video data recording is in progress.

Changing the color of the pause icon from green to red shows the user that the camera has accepted the recording-start command but video recording does not start yet. Thus, it is preferable that the color indicating the second form be different from that indicating the first form. The user can easily understand the working state of wearable camera 100 by the differently colored pause icon. That is, looking at the icon whose color changes from green to red, the user easily understands the current state—wearable camera 100 has received the recording-start command but the recording action does not start yet.

Furthermore, it is preferable that the color of the first mark in the second form be the same as that of the second mark. That is, looking at the pause icon of red, the user easily understands the current state—wearable camera 100 does not start recording yet but it is not so long before starting.

Hereinafter, the configuration and the workings of wearable camera 100 will be described also with reference to FIG. 2 and FIG. 3.

1. The Electrical Configuration of Wearable Camera 100

First, the electrical configuration of wearable camera 100 is described with reference to FIG. 2.

Camera head 200 has optical system 210, CMOS image sensor (hereinafter, sensor) 220, and analog/digital converter (hereinafter, ADC) 230.

Optical system 210 is formed of a combination of the components properly selected from a zoom lens, a camera-shake correction lens, a focus lens, and a diaphragm so as to be suitable for the optical design concept. When optical system 210 has a structure that drives a lens, optical system 210 may contain an actuator for driving the lens.

Sensor 220 generates image data based on the image of an object formed by optical system 210. Sensor 220 carries out the following actions: exposure, transfer, and an electronic shutter.

ADC 230 converts the image data in the analog form generated in sensor 220 into the data in the digital form. The digital image data is fed into image processor 310 in camera body 300 via camera cable 120.

Camera body 300 has image processor 310, controller 320, buffer 330, display monitor 340, operation member 350, card slot 360, internal memory 370, and Wi-Fi module 380.

Image processor 310 processes the image data generated in sensor 220 to generate a data to be shown on display monitor 340 and a data to be stored in memory card 400 as a recording medium. For example, image processor 310 carries out gamma compensation, white balance compensation, and defect correction on the image data generated in sensor 220. Besides, image processor 310 compresses the image data generated in sensor 220 into a data compression format conforming to H.264 or MPEG-2. Image processor 310 is formed of a digital signal processor and/or a microcomputer.

Controller 320 controls the whole system of wearable camera 100. Controller 320 can send a control signal to a component disposed in camera head 200 via camera cable 120. Further, controller 320 functions as a record control section that starts recording of video image data based on the taking-image result by camera head 200 onto a recording medium after the operation buttons of operation member 350 have received a predetermined operation and then a predetermined period of time has passed. Controller 320 is formed of a semiconductor device, for example. Controller 320 may be formed of dedicated hardware only or may be a combination of hardware and software. Controller 320 may be formed of a microcomputer and the like.

Buffer 330 functions as working memory for image processor 310 and controller 320. Buffer 330 is formed of, for example, DRAM or ferroelectric memory.

Display monitor 340 can display an image of the image data generated in sensor 220 and an image of the image data read out of memory card 400. Display monitor 340 can also display various menu screens used for setting of wearable camera 100.

Operation member 350 is the collective term of user interface for accepting user operation. Operation member 350 includes, for example, the arrow keys and the "OK" button for receiving the operation by the user, and the video recording button for determining recording start/stop. Although the video recording button doubles as the recording-start button during the video non-recording state and the recording-stop button during the video recording state in the description below, it is not limited to; the recording-stop button may be disposed separately from the recording-start button. Although operation member 350 shown in FIG. 1A is a hard key disposed on the exterior of wearable camera 100, it is not limited to; operation member 350 may be formed of a soft key as a button icon shown on display monitor 340. In that case, the user operates the button icon via a touch screen.

Card slot 360 can accept memory card 400 which is detachable from card slot 360. Card slot 360 can be connected to memory card 400 mechanically and electrically. Memory card 400 has flash memory or ferroelectric memory therein and can store data such as image file generated in image processor 310.

Internal memory 370 is formed of flash memory or ferroelectric memory. Internal memory 370 stores control program for controlling the whole system of wearable camera 100.

Wi-Fi module 380 is a communication module that conforms to protocol IEEE802.11. Wearable camera 100 communicates with other communication devices having a Wi-Fi module via Wi-Fi module 380. For example, via Wi-Fi module 380, wearable camera 100 transfers the image data generated in image processor 310 and the image data stored in memory card 400 to other communication devices, such as a smartphone. Wearable camera 100 may communicate directly with other communication devices via Wi-Fi module 380 or may communicate with them via an access point.

Wi-Fi module 380 may be replaced with other communication modules that conform to protocol 802.15.1, i.e., Bluetooth®.

2. The Workings of Wearable Camera 100

Next, video recording and display relating to the video recording of wearable camera 100 will be described with reference to FIG. 2, FIG. 3, and FIGS. 4A through 4C.

Upon power-on of wearable camera 100, controller 320 supplies each section forming wearable camera 100 with electric power. Receiving electric power, the lenses of optical system 210 and sensor 220 complete the initial setting to move into workable condition.

Wearable camera 100 has a video-recording mode for video recording and a video-replay mode for replaying the recorded video. When wearable camera 100 is in the video-recording mode, sensor 220 starts to take an image of an object in response to the power-on of wearable camera 100, and accordingly, display monitor 340 starts to display image based on the image data generated by sensor 220. At that time, the image data is not recorded yet, and controller 320 displays green pause mark 600A on display monitor 340 of camera body 300 (corresponding to S500 of FIG. 3). Pause mark 600A indicates that video image data is not recorded. The color of green indicates that controller 320 does not accept the video recording command. Looking at green pause mark 600A, the user can easily understand that video image data is not recorded and the video recording command is not accepted.

Controller 320 detects whether or not the video recording button of operation member 350 is pushed (S 510). Controller 320 keeps displaying green pause mark 600A on display monitor 340 until the video recording button is pushed (corresponding to "NO" in S 510). The user pushes the video recording button at an appropriate timing to start video recording. If the video recording button is pushed (corresponding to "YES" in S 510), controller 320 displays, as shown in FIG. 4B, red pause mark 600B on display monitor 340 (S 520). Pause mark 600B is the same in shape and size as pause mark 600A. Like pause mark 600A, pause mark 600B indicates that video image data is not recorded. Looking at the shape of the displayed mark (i.e., the first mark), the user can easily understand that video image data is not recorded. Meanwhile, the color of red indicates that controller 320 has accepted the video recording command. Looking at red pause mark 600B, the user can easily understand that the video recording command has been accepted although video image data is not recorded.

Controller 320 detects whether or not a predetermined period of time passes after the video recording button has been pushed in S 510 (corresponding to S 530). It is preferable that the predetermined period of time be set equal to an average time required for users from pushing the video recording button to directing camera head 200 toward an intended object. Until the predetermined period of time passes, controller 320 stands by (corresponding to "NO" in S 530) while displaying red pause mark 600B on display monitor 340.

Upon determining that the predetermined period of time has passed (corresponding to "YES" in S 530) after the pushing action of the video recording button in S 510, controller 320 requests image processor 310 to record the video image data based on an image fed from sensor 220 to memory card 400 (S 540). When the recording of the video image data to memory card 400 starts, controller 320 displays now-recording mark 610 in red on display monitor 340 as shown in FIG. 4C (S 550). Now-recording mark 610 indicates that video image data is now being recorded. The color of red indicates that controller 320 has accepted the video recording command. Looking at red now-recording mark 610, the user can easily understand that the video recording command has been accepted and video image data is now being recorded.

When the video recording button of operation member 350 is pushed during recording of video image data, the recording-stop operation is carried out. The recording-stop operation, which is an interrupt action, is carried out by user's pushing action on the video recording button at an appropriate timing during video recording. That is, in response to the pushing action on the video recording button, controller 320 stops recording video image data to memory card 400. When the recording of video image data to memory card 400 is stopped, controller 320 displays again, as shown in FIG. 4A, green pause mark 600A on display monitor 340. As described earlier, pause mark 600A indicates that video image data is not recorded, and the color of green indicates that controller 320 does not accept a video recording command. Looking at green pause mark 600A, the user can easily understand that video image data is not recorded and the video recording command is not accepted.

3. Effect

As described above, wearable camera 100 has display monitor 340 as a display section, sensor 220 as an imaging section for taking an image of an object, operation member 350 including an operation section for accepting user operation, and controller 320 capable of functioning as a record control section. After operation button 350 accepts a predetermined operation thereon and a predetermined period of time passes thereafter, controller 320 starts to record video image data based on the image generated by sensor 220 to memory card 400 as a recording medium.

Display monitor 340 displays the first mark in a first form until operation member 350 accepts a predetermined operation. Further, until a predetermined period of time passes after operation member 350 has accepted the predetermined operation, display monitor 340 displays the first mark in a second form different from the first form. After the predetermined period of time has passed, display monitor 340 displays the second mark different from the first mark.

In response to acceptance of the predetermined operation at operation member 350, wearable camera 100 changes the display form of the first mark from the first form to the second form, thereby informing the user that operation member 350 has accepted the operation. Besides, until a predetermined period of time has passed, wearable camera 100 maintains the display of the first mark, thereby informing the user that action related to the operation does not start. The user can easily understand that the device has accepted the working command while the working state is not changed.

The first mark indicates the previous state of recording start of video image data based on the image generated by sensor 220 to memory card 400. The second mark indicates, on the other hand, that video image data based on the image generated by sensor 220 is in process of being recorded to memory card 400. With the mark above, wearable camera 100 informs the user that operation member 350 have accepted a video recording command; at the same time, it informs the user that video recording does not start until a predetermined period of time passes.

In addition, according to wearable camera 100, the color of the second form is different from that of the first form. Checking only the color for change allows the user to notice quickly whether or not wearable camera 100 has accepted an operation of a video recording command.

Instead of changing the colors between the first form and the second form, the first form may be distinguished from the second form by other methods. For example, in the first form, a still image may be employed for the first mark, whereas in the second form, a blinking image or rotating image may be employed for the first mark; alternatively, the size of the first mark may be changed between the first form and the second form. In each case, since the first mark has no change in shape, the user notices that video image data is not recorded but the process is in progress toward the next action.

The aforementioned display action is particularly useful for the following structure; a holding section is provided so as to fix an imaging section to the position that turns in the direction together with a visual direction of the user and the display section is included in a unit separated from the imaging section and communicates with the imaging section via wired or wireless connection. Although ear hook 110 is described as an example of the holding section in the description above, it is not limited to; the imaging section may be fixed on another part on the head, or on the shoulder. Also in these cases, it takes a certain length of period of time until the user directs camera head 200 toward an intended object after the user has looked at an image or mark on the display and pushed the video recording button.

In the above description, recording of video image data does not start until a predetermined period of time has passed after acceptance of a predetermined operation through the operation button, but the present disclosure can be applied to other cases. When video image data is recorded onto a recording medium, the recording period of time depends on specifications of hardware or software. In some cases, if the user pushes the image recording button of operation member 350 during data recording to stop the recording, the recording may not stop quickly. In this case, if the user turns the power off immediately after the recording stop operation, the video data may be lost because the data recording onto the recording medium has not completed. To avoid the problem above, display monitor 340 may display the marks as follows: display monitor 340 displays, as shown in FIG. 4C, recording-now mark 610 in red (indicating the first form) as the first mark until the operation button accepts the recording-stop operation; display monitor 340 displays the recording-now mark in green (indicating the second form)—not in red—until a predetermined period of time passes after acceptance of the recording-stop operation through the operation button; and display monitor 340 displays pause mark 600A (different from the recording-now mark) as the second mark after the predetermined period of time has passed. The aforementioned structure has a beneficial effect on other imaging devices other than wearable cameras.

The technique of the disclosure has been shown as an example in the embodiment above; however, it is not limited thereto; it is applicable to modified, replaced, added, and/or omitted structures of the embodiment.

Therefore, in addition to the components necessary for solving problems, the accompanying drawings and the detailed description can include components that may not be necessary for solving problems. It will be understood that it doesn't mean such unnecessary components should be necessary for the structure of the embodiment although they are described in the accompanying drawings and the detailed description.

Besides, the aforementioned description of the embodiment is merely given as an example of the technique of the present disclosure, and it is therefore susceptible of various modifications, replacement, addition, and omission within the claimed patent scope and the equivalent scope thereto.

As described above, the present disclosure is applicable to digital video cameras, digital still cameras, camera-equipped mobile phones, and camera-equipped smart phones.

What is claimed is:

1. An imaging device comprising:
   a display;
   a camera that generates an image of an object;
   an operation member that accepts an operation; and
   a controller that (i) determines whether or not a predetermined period of time has passed after a predetermined operation through the operation member is accepted and (ii) when it is determined that the predetermined period of time has passed after the predetermined operation through the operation member is accepted, starts recording video image data based on the generated image onto a recording medium,
   wherein (i) the display displays a first mark in a first form until the operation member accepts the predetermined operation, (ii) the display displays the first mark in a second form different from the first form until the controller determines that the predetermined period of time has passed after the predetermined operation through the operation member is accepted, and (iii) the display displays a second mark different from the first mark after the controller determines that the predetermined period of time has passed after the predetermined operation through the operation member is accepted.

2. The imaging device according to claim 1, wherein the first mark indicates a state previous to the start of recording the video image data onto the recording medium, and the second mark indicates a state in which recording of the video image data onto the recording medium is in progress.

3. The imaging device according to claim 1, wherein a color of the second form is different from a color of the first form.

4. The imaging device according to claim 3, wherein the color of the second form is same as a color of the second mark.

5. The imaging device according to claim 1 further comprising:
   a holder configured to fix the camera to a position that turns in a direction together with a visual direction of the user,
   wherein the display is separate from the camera, and the display communicates with the camera via wired or wireless connection.

6. An imaging device comprising:
   a display;
   a camera that generates an image of an object;
   an operation member that accepts an operation; and
   a controller that (i) determines whether or not a predetermined period of time has passed after a predetermined operation through the operation member is accepted and (ii) when it is determined that the predetermined period of time has passed after the predetermined operation through the operation member is accepted, starts recording video image data based on the generated image onto a recording medium,
   wherein (i) the display displays a first mark until the controller determines that the predetermined period of time has passed after the predetermined operation through the operation member is accepted, the first mark indicating that the recording video image data onto the recording medium has not started, and (ii) the display displays a second mark different from the first mark after the controller determines that the predetermined period of time has passed after the predetermined operation through the operation member is accepted, the second mark indicating that the recording video image data onto the recording medium has started.

7. An imaging device comprising:

a display;

a camera that generates an image of an object;

an operation member that accepts an operation; and a controller that (i) determines whether or not a predetermined period of time has passed after a predetermined operation through the operation member is accepted and (ii) when it is determined that the predetermined period of time has passed after the predetermined operation through the operation member is accepted, starts recording video image data based on the generated image onto a recording medium, wherein (i) the display displays a first mark until the controller determines that the predetermined period of time has passed after the predetermined operation through the operation member is accepted, and (ii) the display does not display the first mark and displays a second mark different from the first mark after the controller determines that the predetermined period of time has passed after the predetermined operation through the operation member is accepted.

* * * * *